United States Patent
Richman et al.

[11] Patent Number: 6,050,292
[45] Date of Patent: Apr. 18, 2000

[54] ABSOLUTE PRESSURE REGULATOR VALVE ASSEMBLY

[75] Inventors: Isaac Richman, Newport Beach; James D. Gehris, Palos Verdes; Wesley A. King, Orange, all of Calif.

[73] Assignee: McDonnell Douglas Corp., Seal Beach, Calif.

[21] Appl. No.: 09/221,221

[22] Filed: Dec. 23, 1998

[51] Int. Cl.⁷ ............................................. F16K 31/12
[52] U.S. Cl. ................................. 137/510; 137/495
[58] Field of Search ................................ 137/906, 510, 137/509, 495, 494

[56] References Cited

U.S. PATENT DOCUMENTS

| | | |
|---|---|---|
| 1,199,847 | 10/1916 | Wilkins . |
| 1,967,981 | 7/1934 | Thomas . |
| 2,437,187 | 3/1948 | Eshbaugh ............................ 137/153 |
| 2,618,290 | 11/1952 | Van Vliet ............................ 137/510 |
| 2,766,593 | 10/1956 | Mitchell et al. . |
| 2,809,708 | 10/1957 | Edwards ............................ 180/82.1 |
| 3,709,242 | 1/1973 | Chase .................................. 137/81 |
| 4,077,569 | 3/1978 | Deines ................................ 137/509 |
| 4,716,927 | 1/1988 | Vayra .................................. 137/495 |
| 4,877,048 | 10/1989 | Oltean et al. ...................... 137/510 |
| 4,903,721 | 2/1990 | Maier .................................. 137/510 |
| 5,193,575 | 3/1993 | Do ................................... 137/906 X |
| 5,394,900 | 3/1995 | Okuyama et al. ................. 137/510 |
| 5,564,278 | 10/1996 | Gallivan .............................. 62/51.2 |
| 5,692,379 | 12/1997 | Gallivan et al. ..................... 62/51 |
| 5,694,975 | 12/1997 | Eidsmore ........................... 137/489.5 |

*Primary Examiner*—Denise L. Ferensic
*Assistant Examiner*—Joanne Y. Kim
*Attorney, Agent, or Firm*—Lawrence N. Ginsberg

[57] ABSTRACT

An absolute pressure regulator valve assembly for controlling the absolute pressure ($P_C$) of a fluid source. The absolute pressure regulator valve assembly includes a hollow housing having an inlet port and a discharge port. The inlet port is in fluid communication with the fluid source. The discharge port is associated with a valve seat. A bellows assembly is positioned within the housing. The bellows assembly has an open first end and a closed second end. The first end is gas-tight sealed to the housing and is in fluid communication with a means for providing a reference pressure ($P_R$) within the bellows assembly. A valve closure element is attached to the closed end of the bellows assembly. The valve closure element is positioned relative to the valve seat wherein motion of the bellows assembly provides opening and closure of the discharge port. A force biasing assembly is attached to the housing for imposing a force on the closed end to provide a desired adjustment of the pressure at the inlet port. During operation, when a net force on the closed end in the direction of the valve seat is greater than a net force in an opposite direction caused by a decrease of pressure at the inlet port, the valve closure element moves in a direction towards the valve seat.

6 Claims, 2 Drawing Sheets

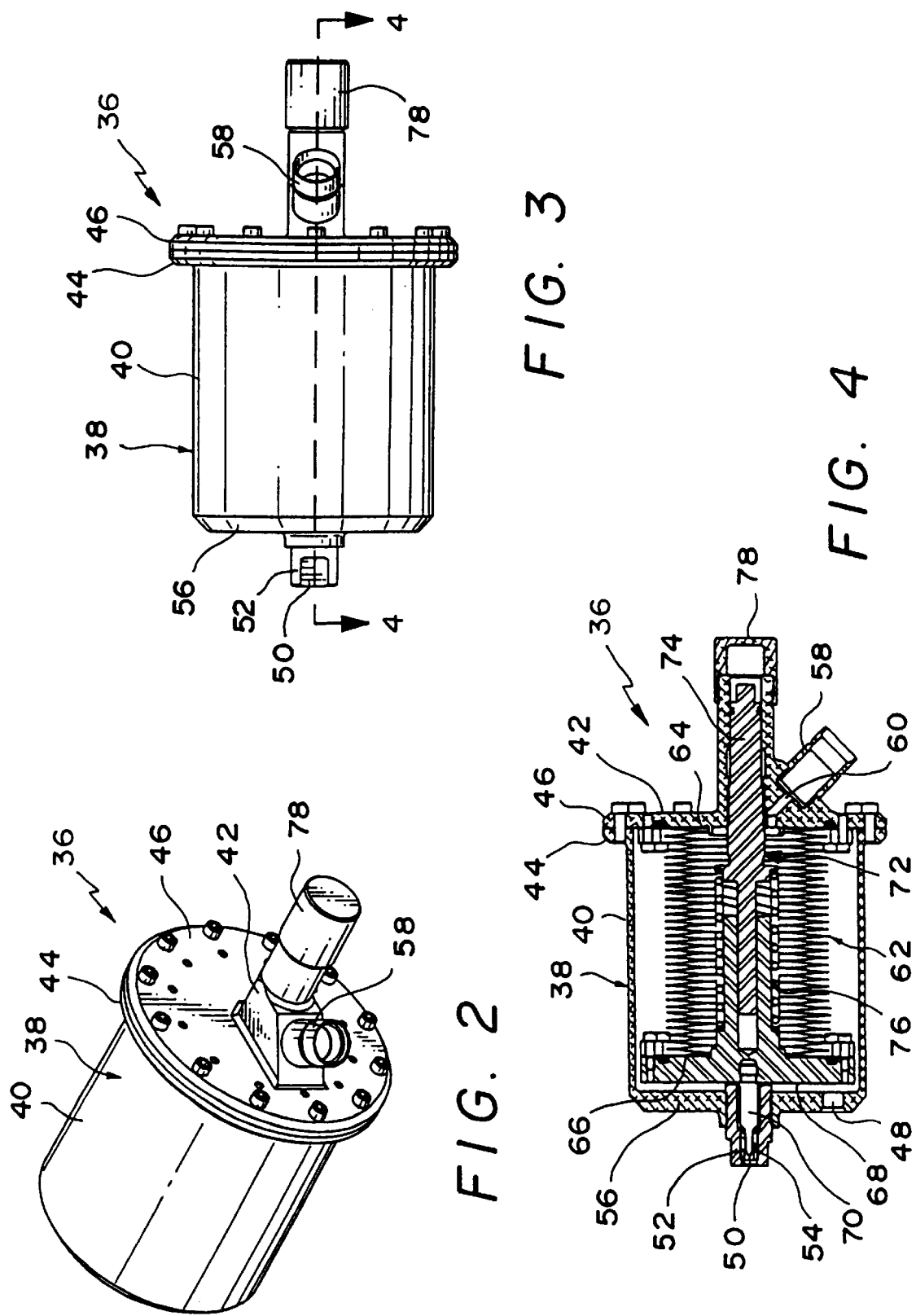

ABSOLUTE PRESSURE REGULATOR VALVE ASSEMBLY

BACKGROUND OF THE INVENTION

1. Field of the Invention

The present invention relates to pressure regulators and more particularly to a pressure regulator valve assembly for regulating the absolute pressure of a fluid source.

2. Description of the Related Art

In operating a cryogenically cooled sensor in an aircraft, the sensor temperature must be held fixed, independent of the ambient pressure. If the cooling is provided by a cryogen reservoir, this typically implies that the absolute pressure in the reservoir be held within a narrow range in the neighborhood of an ideal value. Similar problems may occur in chemical processing, where the pressure within one vessel must be held fixed; independent of the pressure in the region to which fluids are exhausted, or from which they are supplied. Existing mechanical (nonelectrical) pressure regulators are generally differential and not absolute, and they regulate downstream pressure.

Examples of pressure regulators that control downstream pressure include U.S. Pat. No. 2,766,593, issued to O. Mitchell et al.; U.S. Pat. No. 3,709,242, issued to Charles P. Chase; and, U.S. Pat. No. 5,694,975, issued to Paul G. Eidsmore.

U.S. Pat. No. 5,692,379, issued to J. R. Gallivan et al.; and, U.S. Pat. No. 5,564,278, issued to J. R. Gallivan, disclose long-term thermally stable cryostats.

U.S. Pat. No. 4,709,575, issued to W. P. Myers, discloses an absolute pressure regulator containing an "aneroid". The Myers regulator utilizes the pressure differential of two gases to regulate flow.

U.S. Pat. No. 5,394,900, issued to S. Okuyama et al., discloses a pressure regulating valve in which a resinous bellows expands and contracts in the axial direction in accordance with the pressure fluid. This causes a valve body retained in the bottom portion of the bellows by means of a valve body retaining member to come in contact with and separate from a valve seat to thereby regulate the outflow of fluid, where the resultant fluid pressure can be regulated to a desired pressure.

None of the aforementioned devices regulates upstream pressure and provide for a vacuum reference and a bias for adjusting the pressure.

OBJECTS AND SUMMARY OF THE INVENTION

It is therefore a principal object of the present invention to control the absolute pressure of a fluid source without resort to the use of electrical pressure sensing and control.

It is another object to provide pressure regulation independent of the ambient pressure and of the ambient temperature.

It is another object to regulate the upstream pressure, i.e., the pressure at the inlet port of the pressure regulator valve assembly.

These and other objects are achieved by the present invention, which is an absolute pressure regulator valve assembly for controlling the absolute pressure ($P_C$) of a fluid source. The absolute pressure regulator valve assembly includes a hollow housing having an inlet port and a discharge port. The inlet port is in fluid communication with the fluid source. The discharge port is associated with a valve seat. A bellows assembly is positioned within the housing. The bellows assembly has an open first end and a closed second end. The first end is gas-tight sealed to the housing and is in fluid communication with a means for providing a reference pressure ($P_R$) within the bellows assembly. A valve closure element is attached to the closed end of the bellows assembly. The valve closure element is positioned relative to the valve seat wherein motion of the bellows assembly provides opening and closure of the discharge port. A force biasing assembly is attached to the housing for imposing a force on the closed end to provide a desired adjustment of the pressure at the inlet port. During operation, when a net force on the closed end in the direction of the valve seat is greater than a net force in an opposite direction caused by a decrease of pressure at the inlet port, the valve closure element moves in a direction towards the valve seat.

The pressure regulator valve of the present invention permits absolute pressure regulation without the use of electrical pressure sensing and control. The regulation is independent of the ambient pressure, and independent of the ambient temperature. The present invention is adaptable for regulating either upstream or downstream pressure. The operation is purely mechanical. As a result, no ancillary support devices are required. In addition, if the fluids are flammable, or explosive, the regulator valve assembly is not a source of arcs or electrical failure, which may ignite those fluids or their vapors.

BRIEF DESCRIPTION OF THE DRAWINGS

FIG. 2 is a perspective view of a preferred embodiment of the absolute pressure regulator valve assembly of the present invention.

FIG. 3 is a side view of the FIG. 2 embodiment.

FIG. 4 is a cross sectional view of the FIG. 2 embodiment, taken along plane 4—4 of FIG. 3.

The same elements or parts throughout the figures are designated by the same reference characters.

DETAILED DESCRIPTION OF THE PREFERRED EMBODIMENT

Figure 1:
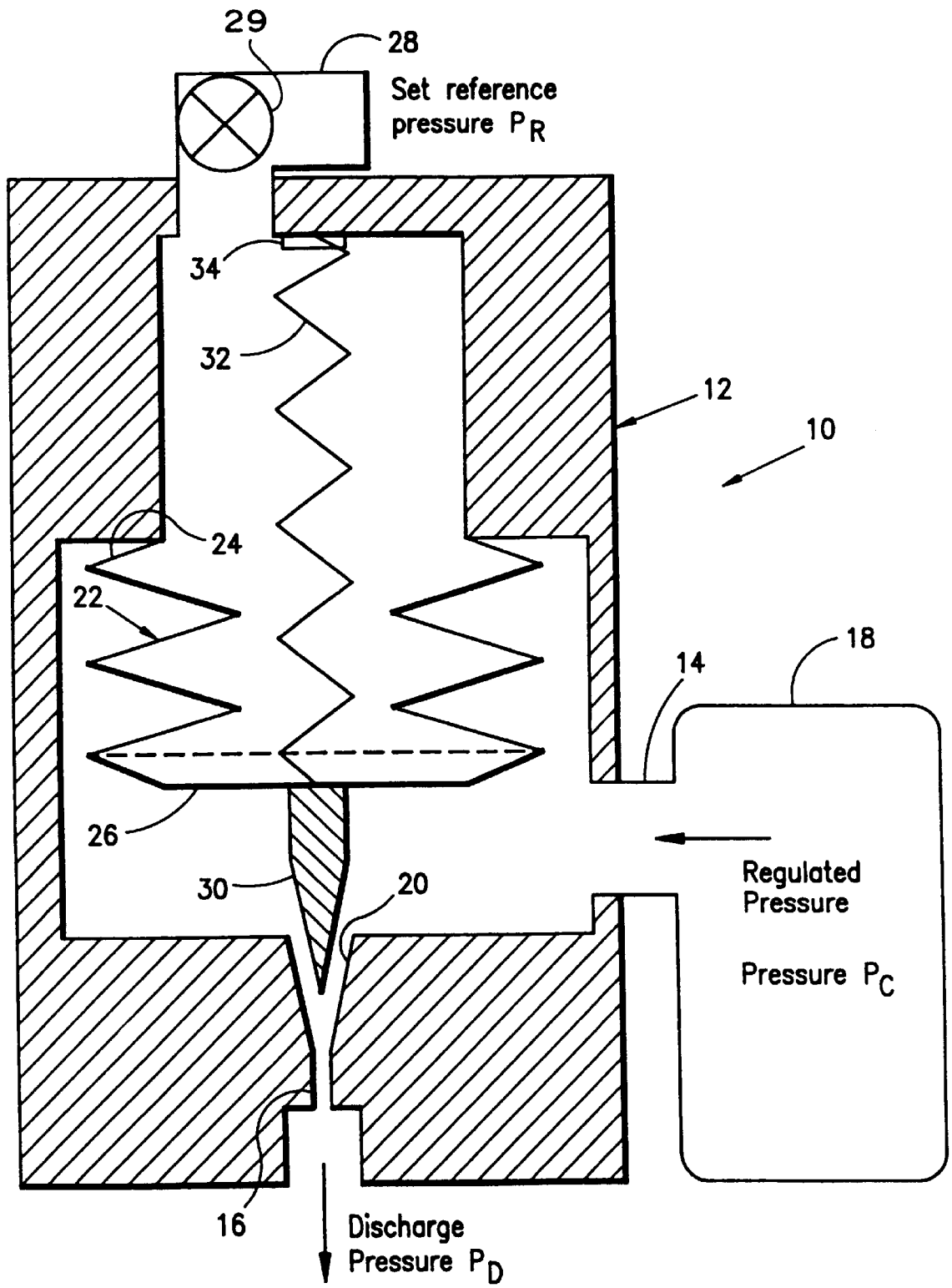
FIG. 1 is a schematic illustration of the absolute pressure regulator valve assembly of the present invention.

Referring now to the drawings and their characters of reference marked thereon, FIG. 1 is a schematic representation of an absolute pressure regulator valve assembly of the present invention, designated generally as 10. A hollow housing, designated generally as 12 includes an inlet port 14 and a discharge port 16. The inlet port 14 is in fluid communication with the fluid source 18. The discharge port 16 is associated with a valve seat 20.

A bellows assembly, designated generally as 22 is positioned within the housing 12. The bellows assembly 22 has an open first end 24 and a closed second end 26. The first end 24 is gas-tight sealed to the housing 12 and is in fluid communication with a means 28 for providing a reference pressure ($P_R$) within the bellows assembly 22. The means 28 for providing $P_R$ includes a seal-off valve 29 to seal-off the $P_R$ volume within the bellows assembly 22.

A valve closure element 30 is attached to the closed end 26 of the bellows assembly 22. The valve closure element 30 is positioned relative to the valve seat 20 so that motion of the bellows assembly 22 provides opening and closure of the discharge port 16. A force biasing assembly 32, 34 is attached to the housing 12 for imposing a force on the closed end 26 to provide a desired adjustment of the pressure at the inlet port 14. The force biasing assembly may be either internal or external to the bellows assembly 22.

During operation, when a net force on the closed end 26 in the direction of the valve seat 20 is greater than a net force in an opposite direction caused by a decrease of pressure at the inlet port 14, the valve closure element 30 moves in a direction toward the valve seat 20.

Referring now to FIGS. 2–4, a preferred embodiment of the present invention is illustrated, designated generally as 36. The assembly 36 includes the housing 38 with two sections 40, 42 which mate at flanges 44, 46. Section 40 is generally cylindrical and includes an inlet port 48, which is in fluid communication with a fluid source (not shown). A discharge port 50 is provided by a discharge port assembly. The discharge port assembly includes a threaded tube 52 and a valve seat 54. The tube 52 engages an end 56 of the housing 38. The tube 52 serves a secondary function as a stop for the bellows assembly 62. The bellows flange 68 is stopped by tube 52. The discharge port 50 acts as an orifice and is adjustable so that the flow of fluid from the interior of the housing 38 may be regulated. A reference pressure port 58 is in fluid communication via passage 60 with the interior of a bellows assembly designated generally as 62. The reference pressure port 58 is vacuum-sealed to the housing by braising or other suitable means. A seal-off valve (not shown) attaches to port 58.

The bellows assembly 62 includes an open first end 64, which is sealed to the flange 46. A second end 66 of the bellows assembly 62 is closed by bellows flange 68.

A valve closure element 70 is attached to bellows flange 68 so that it moves commensurate with contractions and expansions of the bellows assembly 62. A force biasing assembly, designated generally as 72, includes a threaded shaft or rod 74 operably engageable with a helical spring 76. The spring 76 fits around rod 74. Threads on the rod 74 engage corresponding threads on the section 42. The rotation of the threaded rod 74 causes contraction/expansion of the helical spring 76, thereby varying the force on bellows flange 68. A cap 78 protects the adjustment end of the threaded rod 74. Seals on the shaft 74 prevent loss of vacuum. A seal under the cap 78 serves as a secondary seal against vacuum loss.

For use with a cryogenically cooled sensor, the regulator maintains constant absolute pressure within a cryogenic reservoir whose pressure is always somewhat greater than that of the ambient. In this case, excess fluid (i.e., the gaseous boil-off) from the reservoir is exhausted to the ambient fluid, which for an aircraft application is air.

To understand the principles of operation more clearly, assume the ideal regulated reservoir pressure is $P_C$, and $P_D < P_C$ is the variable pressure of the region into which the discharge occurs. Let the nominal fluid flow rate from the reservoir, when it is at PC, be L liters per second. With the valve closure element open sufficiently to permit L flow with a small pressure drop, the net force, $F_C$, compressing the bellows assembly is approximately $F_C = P_C \times A_B$, if the pressure force on the valve closure element is neglected. $A_B$ is defined as effective area of the bellows assembly on which $P_C$ acts. The valve closure element cross-sectional area is made very small, making this a good approximation. Let the extension force on the bellows assembly be $F_E$. The bellows has a spring constant. The force biasing assembly and bellows combined may be considered to be a spring. This combined spring may use either a compression or a tension spring. If in tension, it's force subtracts from $F_E$, if in compression it adds to the $F_E$. Also adding to the extensive force, $F_E$, on the bellows is the reference pressure force, $P_R \times A_B$. With the proper choice of reference pressure, spring constant and length, bellows stiffness, area and length, and valve closure element dimension, the compressive and extensive forces acting on the bellows may be balanced when the valve closure element is opened sufficiently to permit L flow rate. If the regulated reservoir pressure increases above $P_C$, the compressive force on the bellows increases, forcing the valve closure element to open further. If the regulated reservoir pressure falls below $P_C$, the compressive force on the bellows decreases, thereby closing the valve. Thus, to this approximation, the regulated pressure, $P_C$, is independent of the discharge region pressure, and is, thereby, an absolute pressure.

Obviously, many modifications and variations of the present invention are possible in light of the above teachings. It is, therefore, to be understood that, within the scope of the appended claims, the invention may be practiced otherwise than as specifically described.

What is claimed and desired to be secured by Letters Patent of the United States is:

1. An absolute pressure regulator valve assembly for controlling the absolute pressure ($P_C$) of a fluid source, comprising:

a) a hollow housing comprising an inlet port and a discharge port, said inlet port being in fluid communication with a fluid source, said discharge port being associated with a valve seat;

b) a bellows assembly positioned within said housing, said bellows assembly having an open first end and a closed second end, said first end being gas-tight sealed to said housing and being solely in fluid communication with a means for providing a reference pressure ($P_R$) within said bellows assembly;

c) a valve closure element attached to said closed end of said bellows assembly, said valve closure element being positioned relative to said valve seat wherein motion of said bellows assembly provides opening and closure of said discharge port; and, d) a force biasing assembly attached to said housing for imposing a force on said closed end to provide a desired adjustment of the pressure at said inlet port;

wherein during operation, when a net force on said closed end in the direction of said valve seat is greater than a net force in an opposite direction caused by a decrease of pressure at the inlet port, the valve closure element moves in a direction toward the valve seat.

2. The absolute pressure regulator valve assembly of claim 1, wherein said means for providing a reference pressure ($P_R$) comprises means for providing a vacuum.

3. The absolute pressure regulator valve assembly of claim 1, wherein said forced biasing assembly comprises a spring.

4. The absolute pressure regulator valve assembly of claim 3, wherein said forced biasing assembly further comprises a threaded rod operably engageable with said spring and said housing.

5. The absolute pressure regulator valve assembly of claim 1, wherein said valve closure element comprises a needle valve for fine pressure control.

6. An absolute pressure regulator valve assembly for controlling the absolute pressure ($P_C$) of a fluid source, comprising:

a) a hollow housing comprising an inlet port and a discharge port, said inlet port being in fluid communication with a fluid source, said discharge port being associated with a valve seat;

b) a bellows assembly positioned within said housing, said bellows assembly having an open first end and a closed second end, said first end being gas-tight sealed to said housing and being in fluid communication with a means for providing a reference pressure ($P_R$) within said bellows assembly, said means for providing $P_R$ comprising a seal-off valve to seal-off the $P_R$ volume within the bellows assembly;

c) a valve closure element attached to said closed end of said bellows assembly, said valve closure element being positioned relative to said valve seat wherein motion of said bellows assembly provides opening and closure of said discharge port; and, d) a force biasing assembly attached to said housing for imposing a force on said closed end to provide a desired adjustment of the pressure at said inlet port;

wherein during operation, when a net force on said closed end in the direction of said valve seat is greater than a net force in an opposite direction caused by a decrease of pressure at the inlet port, the valve closure element moves in a direction toward the valve seat.

* * * * *